2,863,732
WATER TREATMENT

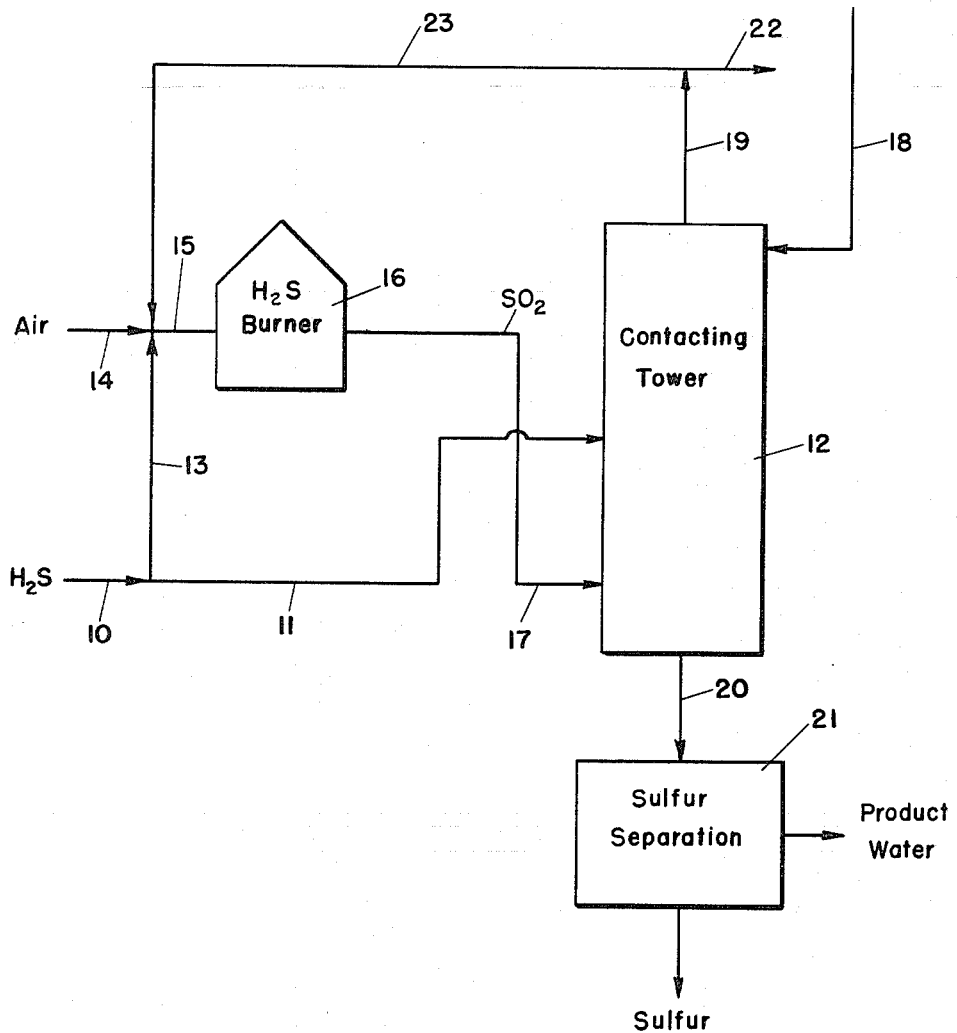

Rolland G. Bowers and Edward F. Mohler, Jr., Toledo, Ohio, assignors to Sun Oil Company, Philadelphia, Pa., a corporation of New Jersey Application February 4, 1955, Serial No. 486,165

7 Claims. (Cl. 23—224)

This invention relates to water treatment and more particularly to the treatment of alkaline waters containing sulfides.

The present invention provides an advantageous manner of reducing alkalinity, removing sulfides, and producing as a valuable product free sulfur. Other advantages are also obtained in various embodiments of the invention.

The invention has been found to be particularly useful in the treatment of alkaline waters obtained as "waste" products in petroleum refining operations, which waters contain as principal inorganic constituents ammonium sulfide and ammonium carbonate, ammonium bisulfide and ammonium bicarbonate being also generally present. The source of the ammonium, sulfide, and carbonate ions etc. is probably decomposition of organic nitrogen and sulfur compounds and hydrocarbons originally contained in hydrocarbons; the water separated from the hydrocarbons in refining operations contains the inorganic ions formed by such decomposition.

Frequently, the waters contain organic constituents also, such as phenols and mercaptans. The invention provides an advantageous manner of reducing the phenol and mercaptan contents of petroleum refinery waters containing the same.

According to the present invention, alkaline waters containing sulfide ions and preferably having pH within the approximate range from 7.5 to 10 are contacted with sulfur dioxide as substantially the sole neutralizing agent. It has been found that such treatment is effective, even in the absence of an added catalyst, to produce large conversion of sulfides to free sulfur, while reducing the alkalinity of the waters and producing a water product, after separation of sulfur, which may be satisfactory for further use, and which, if discarded, is a less objectionable waste product than the water prior to treatment. If the original waters contain mercaptans, the treatment according o the invention converts such compounds.

The treatment can be carried out with sulfur dioxide in either liquid or gaseous phase. Mixtures of $SO_2$ gas with suitable gases such as air can be employed if desired. In one embodiment of the invention, gases containing $H_2S$ can be burned to produce gases containing $SO_2$, and the gas mixture produced by burning used directly as the treating agent for the alkaline waters.

Any suitable temperature can be employed in the treatment. Satisfactory results can be obtained at atmospheric temperature, but other temperatures can be employed if desired. The treatment can be performed at atmospheric pressure or at other pressures if desired. Generally, those conditions which tend to hold gases in solution are favored, though elevated pressures are not required for satisfactory operation.

The treatment can, if desired, be carried out in the presence of any catalyst known to promote the reaction between $H_2S$ and $SO_2$. However, a particularly advantageous feature of the present invention resides in the fact that highly satisfactory results can be obtained without such catalyst.

The treatment with $SO_2$ according to the invention is preferably terminated before the pH of the treated water decreases to less than 4. If the pH of the treated water is too low, excessively large amounts of $H_2S$ appear in the vent gases, and excessively large amounts of sulfur compounds such as sulfites appear in the treated water.

The treatment with $SO_2$ is preferably continued until the water has pH below 7, and more preferably until the pH is below 6.5. If the pH of the product water is too high, the conversion of sulfides and mercaptides may be incomplete.

In one embodiment of the invention, a gas containing $H_2S$ is contacted with the alkaline water prior to the treatment of the water with $SO_2$, and $H_2S$ is absorbed by the water or reacts with constituents thereof. The $SO_2$ treatment according to the invention has proved to be highly satisfactory for the conversion of sulfur compounds introduced into the water by such contacting, as well as conversion of the sulfur compounds present in the water prior to the contacting with $H_2S$-containing gas. In this embodiment, the contacting with $SO_2$ is preferably continued until the pH of the water is below about 5.5, since in this type of operation higher pH tends to result in unsatisfactorily low conversion of sulfides and mercaptides.

The invention will be further described with reference to the attached drawing, which is a schematic flow sheet of one embodiment of the process according to the invention. In the illustrated embodiment, a gaseous mixture containing hydrogen sulfide is passed through lines 10 and 11 into contacting tower 12. The gaseous mixture may have been obtained from any suitable source. Preferably, the $H_2S$ content is high, e. g. above 50 volume percent. One source of such gas is the gas obtained by various processes for absorption of $H_2S$ in a liquid treating agent followed by stripping of $H_2S$ from solution in the liquid to obtain $H_2S$-rich gases.

A portion of the $H_2S$-containing gas passing through line 10 is passed through line 13, mixed with air from line 14, and then passed with the air through line 15 into burner 16. In burner 16, the $H_2S$ is burned to form $SO_2$, and the product gases are passed through line 17 into tower 12. If desired, the gases may be cooled, e. g. to about atmospheric temperature, prior to introduction into tower 12.

Alkaline water having pH in the range from 7.5 to 10 and containing ammonium sulfides is introduced through line 18 into tower 12, which may be for example at atmospheric pressure. As the water descends in tower 12, it contacts $H_2S$ in the gases rising through the tower, and absorbs $H_2S$. The amount of $H_2S$ absorbed is not so great as to render the water acidic prior to contact of the water with the $SO_2$ which is in the rising gases, primarily in the lower parts of the tower 12.

The spent gases are vented from tower 12 through line 19. The vent gases generally contain some $SO_2$, and also $H_2S$ formed from sulfides introduced with the alkaline waters. The vent gases may be removed through line 22 and further treated in any suitable manner, if desired. Alternatively, they may be recycled to the $H_2S$ burner through lines 23 and 15, if desired.

The treated water is withdrawn through line 20 from tower 12. This water preferably has pH below 7, and more preferably in the range from 4 to 6.5. The sulfide and mercaptan content of this water is substantially reduced from that of the charge water and is usually zero. The sulfides have been converted to free sulfur and to thiosulfates; the hydrogen sulfide introduced through line 11 has also been largely converted. The treated water contains some sulfites and sulfates. Free sulfur is separated from the product water in separating zone 21. The resulting product water can be recycled to the contacting tower if desired.

Removal of free sulfur, which is primarily rhombic sulfur, from the product water can be effected in any suitable manner. One advantageous manner of separation involves heating the mixture of product water and sulfur to a temperature above the melting point of sulfur (112.8° C. for rhombic sulfur) at a pressure sufficient to maintain the water in liquid phase and separating molten sulfur from the water. The separated sulfur upon solidification forms monoclinic sulfur. Preferred temperatures are those in the range from 235° F. to 300° F., and preferred pressures those in the range from 5 to 100 p. s. i. g.

Another suitable manner of separating free sulfur from the product water involves allowing the sulfur to settle out. Free sulfur produced over a range of product water pH from 2 to 6 shows good settling characteristics, though the sulfur varies in appearance depending on the pH, the sulfur being lighter colored and more finely divided at lower pH. Free sulfur produced at product water pH above 6 shows inferior settling characteristics.

The following examples illustrate the invention:

*Example I*

The charge water was a mixture of water streams obtained from various sources in a petroleum refinery. One stream had been obtained by separation of water from a gasoline condensate recovered by distillation from the products of catalytic cracking of petroleum; the water recovered was initially introduced into the system as a constituent of the hydrocarbon charge, or in addition thereto, or as sealing steam, etc. Other streams had been obtained by separation of water from gasoline condensates obtained in other distillation operations. The mixture of waters had a pH of 8.85 and contained as principal inorganic constituents ammonium carbonate and bicarbonate and ammonium sulfide and bisulfide. The waters also contained mercaptides. The amounts of inorganic sulfide and of mercaptides respectively were determined by an electrometric titration employing silver nitrate and a silver electrode. The amount of silver nitrate required to titrate from an initial potential above 700 millivolts to 500 millivolts was taken as a measure of the inorganic sulfide content, and the additional amount required to titrate to 150 millivolts was taken as a measure of the mercaptan content. The amount of inorganic sulfide, calculated as hydrogen sulfide, was found to be 1924 p. p. m. The amount of mercaptan, calculated as sulfur, was found to be 93 p. p. m.

The alkalinity of the charge water was determined by titration with 0.02 N. nitric acid, using methyl purple as indicator. The alkalinity was found to be 5050 p. p. m. calculated as calcium carbonate. The alkalinity was calculated as calcium carbonate as a matter of convention only, there being no substantial amount of calcium in the charge water.

Air containing sulfur dioxide gas was bubbled through the charge waters which were initially at atmospheric temperature and pressure, until the pH thereof had been reduced from 8.85 to 5.90, with precipitation of free sulfur in the water. The amount of free sulfur formed was 1278 p. p. m. The following table shows the change in composition of the water as a result of the treatment:

|  | Charge Water | Product Water |
|---|---|---|
| Sulfide content as p. p. m. of $H_2S$ | 1,924 | 17 |
| Mercaptide content as p. p. m. of S | 93 | 17 |
| Alkalinity as p. p. m. of $CaCO_3$ | 5,050 | 130 |

In this table, "sulfide" is reported regardless of whether sulfide salt or $H_2S$ is the actual component present, and "mercaptide" is reported regardless of whether mercaptide or mercaptan is the actual component present. The product water contained 61 p. p. m. of sulfates, determined turbidimetrically by precipitation with barium chloride and calculated as sulfur, and a total of 1864 p. p. m. of sulfites and thiosulfates determined by iodine consumption and calculated as sulfur.

The product water has a pH which makes it satisfactory for use, after separation of sulfur, as cooling water in refinery operations. The sulfur can be separated from the water in any suitable manner, e. g. by heating the product water to melt the sulfur, under pressure sufficient to maintain the water in liquid phase, and separating molten sulfur from water.

The vent gases which are produced in the $SO_2$ treatment contain small amounts of $H_2S$ and $SO_2$ and can be further treated by oxidation or in any other suitable manner if desired.

The treated water, after separation of sulfur, is quite clear and does not develop the dark brown color from organic matter which is normally encountered in the charge water.

This example shows that charge water containing ammonium sulfides and carbonates and having pH of 8.85 can be treated with $SO_2$ as sole treating agent to a pH of 5.9 with conversion of a large amount of the sulfides to free sulfur.

*Example II*

The charge water was a mixture of water streams obtained from the same sources as in Example I but at different times. The charge water initially at atmospheric temperature was passed through a conduit at rates of 60 to 80 gallons per minute, and liquid sulfur dioxide was injected into the conduit at varying rates up to about 200 pounds per hour. Samples were taken from the conduit at a point about four feet downstream from the sulfur dioxide injection. The water was then discharged into a tower from which gaseous and liquid streams were removed. The pH of the charge water was 9.15, and the pH of the samples varied according to the rate of $SO_2$ injection. The following table shows the changes in composition of the water as a result of two treatments, one producing a water having pH of 2.2 and the other producting a water having a pH of 3.0:

|  | Charge—pH 9.15 | Product—pH 2.2 | Product—pH 3.0 |
|---|---|---|---|
| Sulfide (p. p. m. $H_2S$) | 1,973 | 0 | 0 |
| Mercaptan (p. p. m. S) | 46 | 0 | 0 |
| Alkalinity (p. p. m. $CaCO_3$) | 4,750 | | |
| Acidity (p. p. m. $H_2SO_3$) | | 1,472 | 333 |
| Thiosulfates (p. p. m. S) | | 885 | 870 |
| Sulfites (p. p. m. S) | | 3,950 | 1,898 |
| Free Sulfur—p. p. m. | | 2,157 | |

This example shows that operation to a pH as low as 2.2 produces a beneficial conversion of sulfides to free sulfur. For various reasons, as mentioned elsewhere, it is preferred to operate at higher pH, however. In this example, it is noted, operation to a higher pH, namely 3.0, reduces the amount of sulfur compounds (in this case notably sulfites) in the product waters, thus demonstrating one advantage of the higher pH.

*Example III*

The charge water was a mixture of water streams obtained from the same sources as in Example II but at different times. The procedure was the same as in Example II except that the pH of the samples was higher, the $SO_2$ rate having been lower. The following table shows the changes in composition of the water as a result of two treatments, one to pH of 4.9 and one to pH of 7.0:

|  | Charge— pH 9.2 | Product— pH 4.9 | Product— pH 7.0 |
|---|---|---|---|
| Sulfide (p. p. m. $H_2S$) | 2,312 | 0 | 59 |
| Mercaptide (p. p. m. S) | 47 | 0 | 20 |
| Alkalinity (p. p. m. $CaCO_3$) | 4,950 |  | 456 |
| Acidity (p. p. m. $H_2SO_3$) |  | 19 |  |
| Thiosulfates (p. p. m. S) |  | 1,380 | 1,820 |
| Sulfites (p. p. m. S) |  | 892 | 9 |
| Free sulfur—p. p. m. |  | 2,910 | 1,755 |

The product having pH of 7.0 is indicated as having "alkalinity," since the titration used in determining alkalinity is made to an endpoint at pH below 7.

This example shows that operation to pH 4.9 produced highly satisfactory results, including complete sulfide and mercaptide conversion, high yield of free sulfur, and low sulfur compound content in the product water. The latter content, though higher than in the operation to pH 7.0, is lower than in Example I where, in operation to pH 3.0, the combined sulfite and thiosulfate contents were 2768 p. p. m., as compared to 2272 in operation to pH 4.9.

The operation to pH 7.0 did not give complete conversion of sulfide and mercaptide, nor as high a free sulfur yield as the operation to pH 4.9, but did produce beneficial results.

*Example IV*

The charge water was a mixture of water streams obtained from the same sources as in Examples II and III but at a different time. The procedure was the same as in Examples II and III except that the pH of the sample was 6.3. The following table shows the change in composition of the water as a result of the treatment:

|  | Charge— pH 9.0 | Product— pH 6.3 |
|---|---|---|
| Sulfide (p. p. m. $H_2S$) | 2,195 | 0 |
| Mercaptide (p. p. m. S) | 46 | 0 |
| Alkalinity (p. p. m. $CaCO_3$) | 5,100 | 148 |
| Thiosulfates (p. p. m. S) |  | 1,490 |
| Sulfites (p. p. m. S) |  | 672 |
| Free Sulfur—p. p. m. |  | 2,680 |

This example shows that operation to pH 6.3 produced complete sulfide and mercaptide removal and a good yield of free sulfur. The combined sulfite and thiosulfate contents of the product water were 2162 p. p. m., i. e. less than in operation to pH 4.9 in Example III; the free sulfur yield was greater in the operation to pH 4.9. The runs to pH 6.3 and to pH 4.9 are not strictly comparable, however, because of the differences in composition of the charge water.

*Example V*

The charge water was a mixture of water streams obtained from the same sources as in the preceding examples but at a different time. The charge water at atmospheric temperature was introduced into the top of a contacting tower at a rate of 0.25 gallon per minute. A stream of gas containing 71.0 volume percent $H_2S$ and 16.7 volume percent $CO_2$ was introduced at atmospheric temperature into a middle portion of the tower at a rate of 0.20 standard cubic feet per minute. Sulfur dioxide gas was introduced at atmospheric temperature at the bottom of the tower at a rate of 0.077 standard cubic feet per minute. The tower was operated at about atmospheric pressure. Product water having pH of 4.95 was withdrawn from the bottom of the tower, and vent gases were removed from the top of the tower at the rate of 2.07 standard cubic feet per hour. The combined $H_2S$ and $SO_2$ contents of the vent gases were 12.1 volume percent, and the $CO_2$ and oxygen contents were 38.2 volume percent and 7.9 volume percent respectively.

The following table shows the change in composition of the water as a result of the treatment:

|  | Charge— pH 8.8 | Product— pH 4.95 |
|---|---|---|
| Sulfide (p. p. m. $H_2S$) | 1,098 | 0 |
| Mercaptide (p. p. m. S) | 140 | 0 |
| Alkalinity (p. p. m. $CaCO_3$) | 3,600 | 35 |
| Thiosulfates (p. p. m. S) |  | 2,660 |
| Sulfites (p. p. m. S) |  | 61 |
| Free Sulfur—p. p. m. |  | 5,980 |

This example shows that highly satisfactory operation to pH 4.95 can be obtained with addition of $H_2S$-containing gas to the charge water prior to the contacting with $SO_2$.

*Example VI*

The charge water was a mixture obtained from the same sources as in the preceding examples but at different times. The procedure was generally the same as in Example V, the following being the operating data:

Charge water rate: 0.25 gallon per minute
Charge gas composition: 67.6 volume percent $H_2S$, 17.7 volume percent $CO_2$
Charge gas rate: 0.21 standard cubic feet per minute
Sulfur dioxide rate: 0.077 standard cubic feet per minute
Vent gas rate: 3.84 standard cubic feet per hour.

The following table shows the change in composition of the water as a result of the treatment:

|  | Charge— pH 8.90 | Product— pH 5.25 |
|---|---|---|
| Sulfide (p. p. m. $H_2S$) | 1,856 | 2.3 |
| Mercaptide (p. p. m. S) | 47 | 18 |
| Alkalinity (p. p. m. $CaCO_3$) | 5,150 | 35 |
| Thiosulfates (p. p. m. S) |  | 3,560 |
| Sulfites (p. p. m. S) |  | 15 |
| Sulfates (p. p. m. S) |  | 0 |
| Free Sulfur—p. p. m. |  | 5,520 |

Comparison of this example with Example V shows that the operation to pH 4.95 produced greater sulfide and mercaptide removal, greater free sulfur yield, and lower sulfur compound concentration in the product water than operation to pH 5.25. On the other hand, comparison of Examples III and IV showed that operation to pH 4.9 produced the same extent of sulfide and mercaptide removal as, and greater sulfur compound concentration in the product water than, operation to pH 6.3. These apparent discrepancies are probably attributable to differences in charge water composition and operating conditions.

The treatment according to the invention can be conducted in the presence of sulfides or bisulfides of cations other than ammonium, e. g. sodium, potassium, calcium etc. Thus, for example, spent caustic soda from petroleum refining operations can be admixed with alkaline waters containing ammonium sulfide prior to contacting the latter with $SO_2$. In such case, sulfides and bisulfides contained in the spent caustic soda, are converted at least in part to free sulfur and other sulfur compounds.

The pH of the charge water treated according to the invention is preferably within the range from 7.5 to 10; however, the invention may be applied to alkaline waters generally, i. e. waters having pH above 7. Commonly, sulfide-containing waste waters obtained in petroleum refining operations have pH within the range from 8.5 to 9.5, as shown in the examples of the present specification.

According to the present invention, sulfur dioxide serves in a dual capacity, being both a neutralizing agent in the sense that the pH of the charge water is reduced by the contact with $SO_2$, and an oxidizing agent in the sense that it oxidizes the sulfur in the sulfides to the free sulfur state. The sulfur dioxide should be used in an amount in excess of that theoretically required to neutralize the alkalinity of the charge water. Thus, the number of grams of $SO_2$ used per 100 grams of water should be greater than about 0.64 times the number of grams of alkalinity (calculated as $CaCO_3$) per 100 grams of the charge water.

The invention claimed is:

1. In petroleum refinery processes where water contacts petroleum fractions containing inorganic materials formed by decomposition of organic sulfur and nitrogen compounds, and where alkaline water containing ammonium sulfide and ammonium bisulfide is separated from the petroleum fractions, the improvement which comprises contacting said alkaline water with sulfur dioxide as substantially the sole neutralizing agent, thereby to convert substantially all of said ammonium sulfide and ammonium bisulfide to materials including free sulfur and to reduce the pH of the water to below 6, and separating by settling from the treated water at pH below 6 a material consisting essentially of substantially all of said free sulfur.

2. Process according to claim 1 wherein the charge water has pH within the approximate range from 7.5 to 10.

3. Process according to claim 1 wherein $H_2S$-containing gas is contacted with the alkaline water prior to the contacting with $SO_2$.

4. Process according to claim 1 wherein the water from which free sulfur has been separated is subsequently used as a cooling medium in petroleum refining operations.

5. In petroleum refinery processes where water contacts petroleum fractions containing inorganic materials formed by decomposition of organic sulfur and nitrogen compounds, and where alkaline water containing ammonium sulfide and ammonium bisulfide is separated from the petroleum fractions, the improvement which comprises contacting said alkaline water with $H_2S$-containing gas; subsequently contacting the water with sulfur dioxide as substantially the sole neutralizing agent, thereby to convert substantially all of said ammonium sulfide and ammonium bisulfide to materials including free sulfur and to reduce the pH of the water to below 5.5, and separating from the treated water at pH below 5.5 a material consisting essentially of substantially all of said free sulfur.

6. In petroleum refinery processes where water contacts petroleum fractions containing mercaptans and inorganic materials formed by decomposition of organic sulfur and nitrogen compounds, and where alkaline water containing mercaptides, ammonium sulfide and ammonium bisulfide is separated from the petroleum fractions, the improvement which comprises contacting said alkaline water with sulfur dioxide as substantially the sole neutralizing agent, thereby to convert substantially all of said mercaptides, ammonium sulfide and ammonium bisulfide to materials including free sulfur and to reduce the pH of the water to below 6, and separating by settling from the treated water at pH below 6 a material consisting essentially of substantially all of said free sulfur.

7. Process according to claim 6 wherein a gas stream containing $H_2S$ is divided into two streams, one of which is burned to produce $SO_2$ for use in the contacting of water with $SO_2$, the other being contacted with the alkaline water prior to the contacting with $SO_2$.

References Cited in the file of this patent

UNITED STATES PATENTS

| | | |
|---|---|---|
| 1,492,489 | Sutherest | Apr. 29, 1924 |
| 1,672,924 | Bacon | June 12, 1928 |
| 1,834,845 | Jones | Dec. 1, 1931 |
| 2,094,939 | Boulogne | Oct. 5, 1937 |

FOREIGN PATENTS

| | | |
|---|---|---|
| 599,073 | Great Britain | Mar. 4, 1948 |